(12) United States Patent
Lee

(10) Patent No.: US 10,502,437 B2
(45) Date of Patent: Dec. 10, 2019

(54) DEHUMIDIFYING AND COOLING APPARATUS

(71) Applicant: KYUNGDONG NAVIEN CO., LTD, Pyeongtaek-si, Gyeonggi-do (KR)

(72) Inventor: Dong Keun Lee, Seongnam-si (KR)

(73) Assignee: KYUNGDONG NAVIEN CO., LTD, Pyeongtaek-si, Gyeonggi-Do (KR)

( * ) Notice: Subject to any disclaimer, the term of this patent is extended or adjusted under 35 U.S.C. 154(b) by 499 days.

(21) Appl. No.: 15/304,732

(22) PCT Filed: Apr. 13, 2015

(86) PCT No.: PCT/KR2015/003679
§ 371 (c)(1),
(2) Date: Oct. 17, 2016

(87) PCT Pub. No.: WO2015/160159
PCT Pub. Date: Oct. 22, 2015

(65) Prior Publication Data
US 2017/0045244 A1   Feb. 16, 2017

(30) Foreign Application Priority Data

Apr. 18, 2014   (KR) .................. 10-2014-0046977

(51) Int. Cl.
*F24F 3/14*   (2006.01)
*F24F 3/153*   (2006.01)

(52) U.S. Cl.
CPC ............ *F24F 3/1423* (2013.01); *F24F 3/153* (2013.01); *F24F 2003/144* (2013.01);
(Continued)

(58) Field of Classification Search
CPC .. F24F 3/1423; F24F 3/12; F24F 11/77; F24F 3/14; F24F 3/153; F24F 2003/144;
(Continued)

(56) References Cited

U.S. PATENT DOCUMENTS 5,758,509 A   6/1998   Maeda
6,442,951 B1 *   9/2002   Maeda .................. F24F 3/1423
62/271

(Continued)

FOREIGN PATENT DOCUMENTS

CN   1512112 A   7/2004
CN   1821667 A   8/2006
(Continued)

OTHER PUBLICATIONS

Drawing Figures, Korean Patent App. Publication KR20120121776.*
Translation of Description, Korean Patent App. Publication KR20120121776.*

*Primary Examiner* — Elizabeth J Martin
(74) *Attorney, Agent, or Firm* — Novick, Kim & Lee, PLLC; Jae Youn Kim

(57) ABSTRACT

The present invention relates to a dehumidifying and cooling apparatus, comprising: a housing in which a first channel and a second channel are formed; a heating unit disposed inside the first channel; a desiccant rotor which is rotatably provided inside the housing; a cooling unit disposed inside the second channel; and a refrigerant circulation unit having a refrigerant circulation circuit including a compressor and a condenser, wherein the condenser is disposed inside the second channel such that the refrigerant circulated therein, can be condensed by the heat exchange with the second air cooled by the cooling unit.

19 Claims, 5 Drawing Sheets

(52) U.S. Cl.
CPC ............... *F24F 2203/1016* (2013.01); *F24F 2203/1032* (2013.01); *F24F 2203/1068* (2013.01)

(58) Field of Classification Search
CPC ....... F24F 2203/1016; F24F 2203/1032; F24F 2203/1068
See application file for complete search history.

(56) References Cited

U.S. PATENT DOCUMENTS

| | | | |
|---|---|---|---|
| 2002/0116934 A1* | 8/2002 | Dinnage | F24F 3/1405 62/93 |
| 2004/0134211 A1* | 7/2004 | Lee | F24F 3/1423 62/271 |

FOREIGN PATENT DOCUMENTS

| | | | | |
|---|---|---|---|---|
| CN | 103502740 A | 1/2014 | | |
| JP | 2003-074905 A | 3/2003 | | |
| JP | 2003-130391 A | 5/2003 | | |
| JP | 2006-336999 A | 12/2006 | | |
| JP | 2008-128546 A | 6/2008 | | |
| JP | 2009-078246 A | 4/2009 | | |
| JP | 2010-112633 A | 5/2010 | | |
| JP | 2012-211715 A | 11/2012 | | |
| KR | 10-2001-0098148 A | 11/2001 | | |
| KR | 10-2012-0022684 A | 3/2012 | | |
| KR | 20120121776 A | * | 11/2012 | ............... F24F 3/01 |
| KR | 10-1229676 B1 | 2/2013 | | |

* cited by examiner

US 10,502,437 B2

DEHUMIDIFYING AND COOLING APPARATUS

TECHNICAL FIELD

The present invention relates to a dehumidifying and cooling apparatus that can be connected to a panel cooling apparatus, or a cooling apparatus using a fan coil unit or an electric air conditioner, so as to be also applicable to a structure in which air circulation duct equipment for cooling is not formed, and that can improve interior cooling efficiency.

BACKGROUND ART

Dehumidifying and cooling is a technique that performs cooling by controlling a latent heat load using a dehumidifier and reducing temperature using evaporation heat.

In more detail, the dehumidifying and cooling technique performs a process of removing a latent heat load by removing moisture contained in air using a dehumidifier, and of evaporating the dehumidified and dried air by supplying moisture thereto so as to reduce the temperature of the air using evaporation heat, and performs cooling by forming a circulation cycle such that the process is repeated.

The dehumidifying and cooling technique is a new and renewable energy technique in terms of low energy consumption and eco-friendliness, and has been continuously developed.

By way of example of the dehumidifying and cooling technique, there is Korean Patent Application Publication No. 10-2012-0022684 entitled "Dehumidifying and cooling apparatus".

The dehumidifying and cooling apparatus disclosed in the above patent application includes a housing, a dehumidifying module including a first casing, which is disposed in the housing and has interior and exterior passages formed therein by a partition wall, and a desiccant rotor, which is rotatably installed over the interior and exterior passages of the first casing, a regeneration module including a second casing, which is disposed in the housing and has interior and exterior passages formed therein by a partition wall, and a regenerator, which heats air passing through one of the interior and exterior passages, and a cooling module including a third casing, which is disposed in the housing and has interior and exterior passages formed therein by a partition wall, and a sensible rotor which is rotatably installed over the interior and exterior passages of the third casing, wherein the first to third casings are detachably mounted to the housing, and thus the housing has two channels which are partitioned from each other therein.

Conventional dehumidifying and cooling apparatuses including the above patent application have an advantage in terms of low energy consumption and eco-friendliness. However, the dehumidifying and cooling apparatuses have a disadvantage in that they are applicable only to a structure having equipment (e.g. an air circulation duct) through which air cooled by passing through a dehumidification passage may be supplied back to the inside thereof.

In addition, the structure must be further provided with a separate blower which allows cooling air to be smoothly circulated along a supply path thereof. The blower must be usually a blower having high static pressure and high airflow. For this reason, the conventional dehumidifying and cooling apparatuses also have a disadvantage of increasing electricity consumption.

DISCLOSURE

Technical Problem

The present invention has been made in view of the above-mentioned problems, and it is an object of the present invention to provide a dehumidifying and cooling apparatus capable of dehumidifying and cooling the inside of a structure even through the structure which is not provided with air circulation duct equipment which is a supply path of cooling air.

Technical Solution

In accordance with an aspect of the present invention, there is provided a dehumidifying and cooling apparatus including a housing having first and second channels formed therein, first air passing through the first channel, second air passing through the second channel, a heating unit disposed in the first channel to heat the first air, a desiccant rotor rotatably installed in the housing such that the desiccant rotor is dried by the first air heated by the heating unit and absorbs moisture from the second air, a cooling unit disposed in the second channel to cool the second air passing through the desiccant rotor, and a refrigerant circulation unit including a refrigerant circulation circuit including a compressor and a condenser.

The condenser may be disposed in the second channel so that a refrigerant circulating in the condenser is condensed by heat exchange with the second air cooled by the cooling unit.

In the aspect of the present invention, the first air may be air introduced into the first channel from an outdoor space, and the first air passing through the first channel may be discharged to the outdoor space.

In the aspect of the present invention, the second air may be air introduced into the second channel from the outdoor space, and the second air cooled by the cooling unit may be discharged to the outdoor space after heat exchange in the condenser.

In the aspect of the present invention, the second air may be air introduced into the second channel from the outdoor space, and a portion of the second air cooled by the cooling unit may be discharged to the outdoor space after heat exchange in the condenser, while the remainder of the second air cooled by the cooling unit may be supplied to an indoor space.

In the aspect of the present invention, the dehumidifying and cooling apparatus may further include a first blower disposed in the first channel such that the first air forcibly passes through the first channel, and a second blower disposed in the second channel such that the second air forcibly passes through the second channel.

In the aspect of the present invention, each of the first and second blowers may be selectively operated or stopped by a controller.

In the aspect of the present invention, the refrigerant circulation circuit may further include an evaporator, and the dehumidifying and cooling apparatus may further include a cold water circulation pipe connected to the evaporator such that water circulating in the cold water circulation pipe exchanges heat with the refrigerant circulating in the evaporator.

In the aspect of the present invention, a portion of the cold water circulation pipe may be disposed within at least one of an interior floor, an interior ceiling, and an interior wall, or be disposed in a fan coil unit.

In the aspect of the present invention, the refrigerant circulation circuit may further include an evaporator, and the dehumidifying and cooling apparatus may further include a blower fan for forcibly blowing indoor air, such that the indoor air exchanges heat with the refrigerant circulating in the evaporator and is then supplied back to the indoor space.

In the aspect of the present invention, the dehumidifying and cooling apparatus may further include a water supply unit disposed in the second channel so as to spray water on a surface of the condenser.

In accordance with another aspect of the present invention, there is provided a dehumidifying and cooling apparatus including a housing having first, second, and third channels formed therein, first air passing through the first channel, second air passing through the second channel, third air passing through the third channel, a heating unit disposed in the first channel to heat the first air, a desiccant rotor rotatably installed in the housing such that the desiccant rotor is dried by the first air heated by the heating unit and absorbs moisture from the second air and the third air, cooling units disposed in the respective second and third channels so as to respectively cool the second air and the third air passing through the desiccant rotor, and a refrigerant circulation unit including a refrigerant circulation circuit including a compressor and a condenser.

The condenser may be disposed in the second channel so that a refrigerant circulating in the condenser is condensed by heat exchange with the second air cooled by the cooling unit, the third air may be one of air introduced from the indoor space, a mixture (mixed air) of air introduced from the indoor space and air introduced from the outdoor space, and air introduced from the outdoor space, and the third air may be cooled by the cooling unit and is then discharged to the indoor space.

In another aspect of the present invention, the first air may be air introduced from the outdoor space or air introduced from the indoor space, and the first air may be discharged to the outdoor space after passing through the desiccant rotor.

In another aspect of the present invention, the second air may be air introduced from the outdoor space or a mixture (mixed air) of air introduced from the indoor space and air introduced from the outdoor space, and a portion of the second air cooled by the cooling unit may be discharged to the outdoor space after heat exchange in the condenser, while the remainder of the second air cooled by the cooling unit may be supplied to the indoor space.

In another aspect of the present invention, the dehumidifying and cooling apparatus may further include a first blower disposed in the first channel such that the first air forcibly passes through the first channel, a second blower disposed in the second channel such that the second air forcibly passes through the second channel, and a third blower disposed in the third channel such that the third air forcibly passes through the third channel.

In another aspect of the present invention, each of the first, second, and third blowers may be selectively operated or stopped by a controller.

In another aspect of the present invention, the dehumidifying and cooling apparatus may further include an air filter disposed in the third channel.

In another aspect of the present invention, the refrigerant circulation circuit may further include an evaporator, and the dehumidifying and cooling apparatus may further include a cold water circulation pipe connected to the evaporator such that water circulating in the cold water circulation pipe exchanges heat with the refrigerant circulating in the evaporator.

In another aspect of the present invention, a portion of the cold water circulation pipe may be disposed within at least one of an interior floor, an interior ceiling, and an interior wall, or be disposed in a fan coil unit.

In another aspect of the present invention, the refrigerant circulation circuit may further include an evaporator, and the dehumidifying and cooling apparatus may further include a blower fan for forcibly blowing indoor air, such that the indoor air exchanges heat with the refrigerant circulating in the evaporator and is then supplied back to the indoor space.

In another aspect of the present invention, the dehumidifying and cooling apparatus may further include a water supply unit disposed in the second channel so as to spray water on a surface of the condenser.

The above and other objects, features and other advantages of the present invention will be more clearly understood from the following detailed description taken in conjunction with the accompanying drawings.

Advantageous Effects

In accordance with the present invention, the second air passing through a second channel is dehumidified by a desiccant rotor, and is then cooled by a cooling unit. The cooled second air exchanges heat with the refrigerant in a condenser so as to condense the refrigerant. The condensed refrigerant exchanges heat with another fluid in an evaporator, and the heat-exchanged fluid is used for interior cooling.

Accordingly, since a dehumidifying and cooling apparatus according to the present invention realizes interior cooling using another fluid which exchanges heat with the refrigerant, the dehumidifying and cooling apparatus can be applied to a structure, which is not provided with a separate air circulation duct, for cooling the inside of the structure.

In addition, it is possible to improve interior ventilation efficiency as well as interior dehumidifying and cooling efficiency by extracting and supplying a portion of air, which is cooled in the second channel, to the indoor space, or by supplying air, which is dehumidified and cooled through a third channel, to the indoor space using ventilation equipment formed in an existing structure.

Furthermore, when water is sprayed on the surface of the condenser by the operation of a water supply unit, the heat of the second air passing through the condenser is absorbed as the evaporative latent heat of the water sprayed on the surface of the condenser, thereby allowing the temperature of the second air to be further lowered. Therefore, it is possible to further lower the condensation temperature of the refrigerant circulating in the condenser, and thus the power consumption of a compressor can be further reduced.

MODE FOR INVENTION

Hereinafter, a dehumidifying and cooling apparatus according to exemplary embodiments of the present invention will be described in detail with reference to the accompanying drawings. However, the same components as those in various embodiments will be described in detail in only one of the embodiments, and a repeated description thereof will be omitted in the remaining embodiments.

Figure 1:
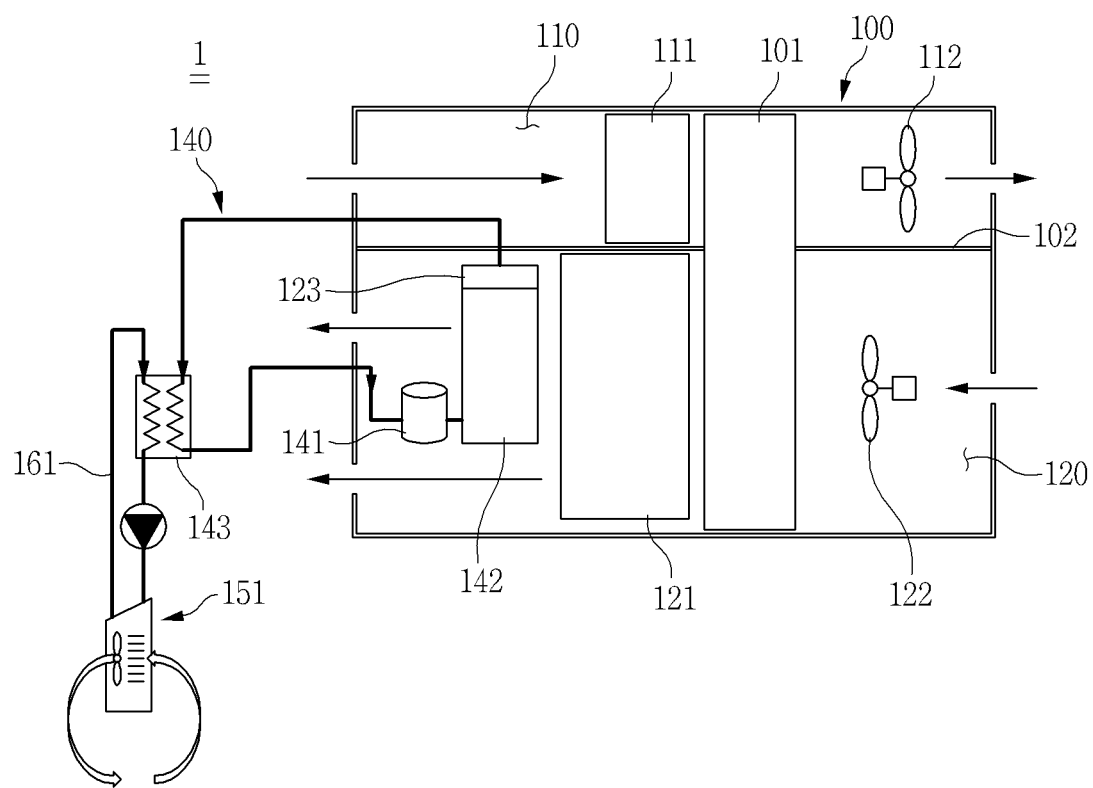
FIG. 1 is a diagram schematically illustrating a dehumidifying and cooling apparatus according to a first embodiment of the present invention.
Figure 2:
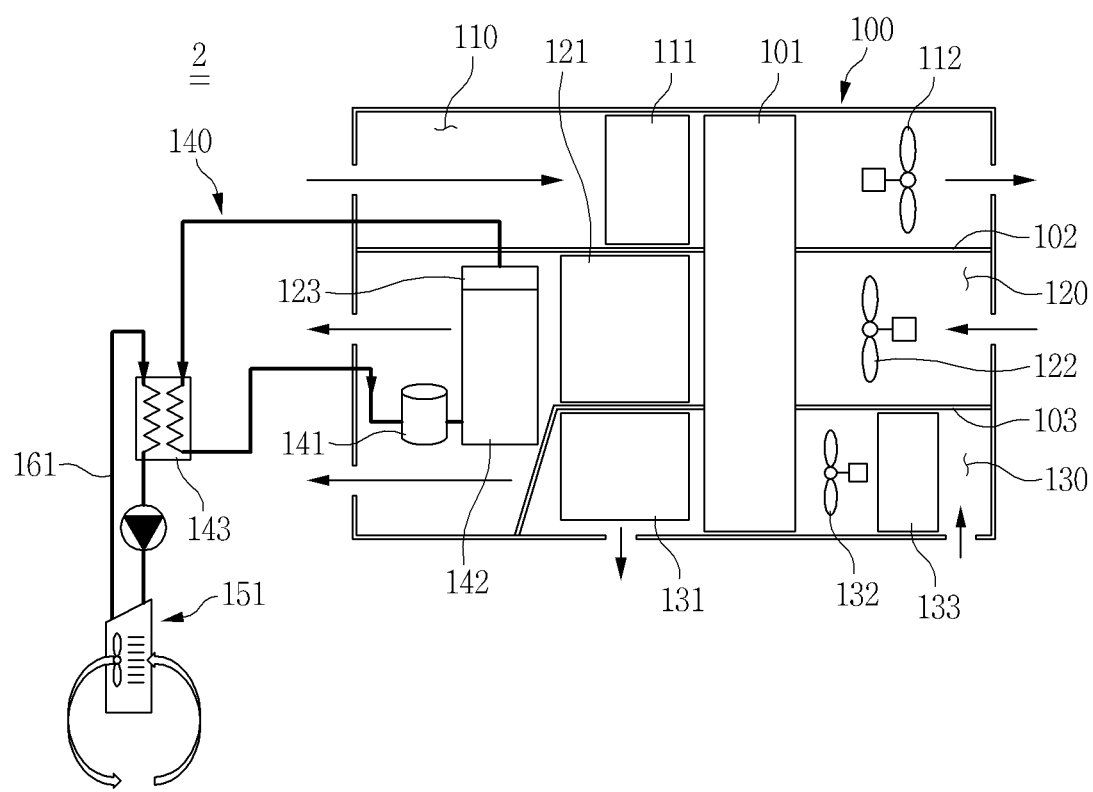
FIG. 2 is a diagram schematically illustrating a dehumidifying and cooling apparatus according to a second embodiment of the present invention.
Figure 3:
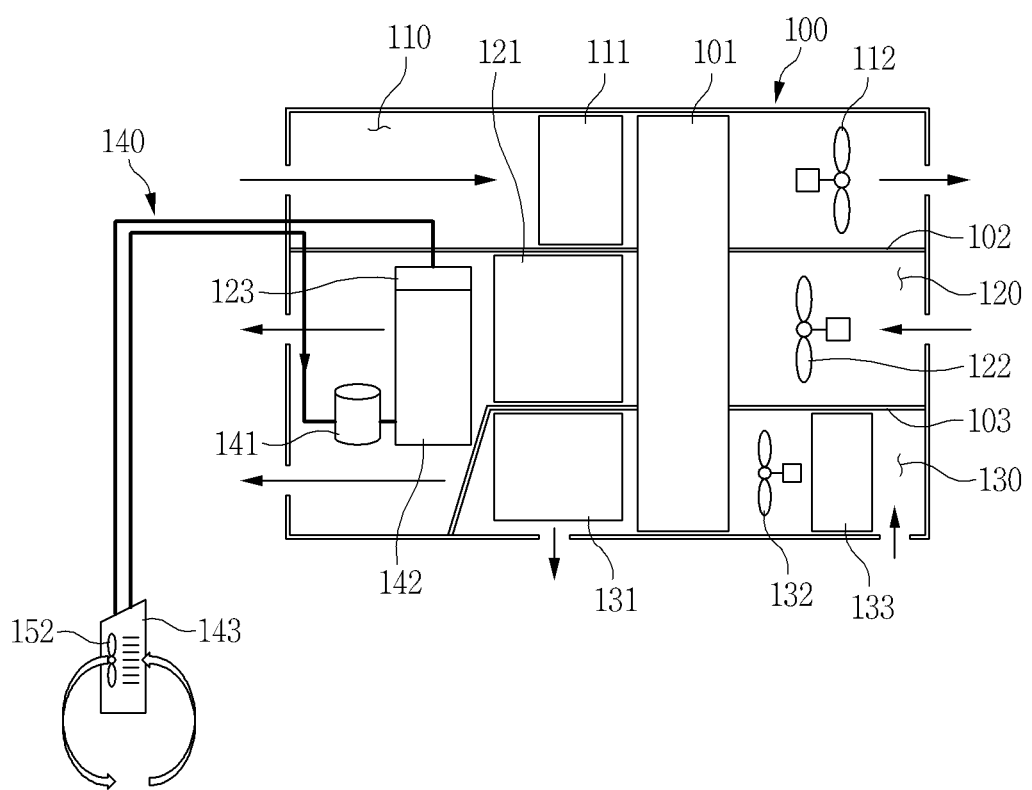
FIG. 3 is a diagram schematically illustrating a dehumidifying and cooling apparatus according to a third embodiment of the present invention.
Figure 4:
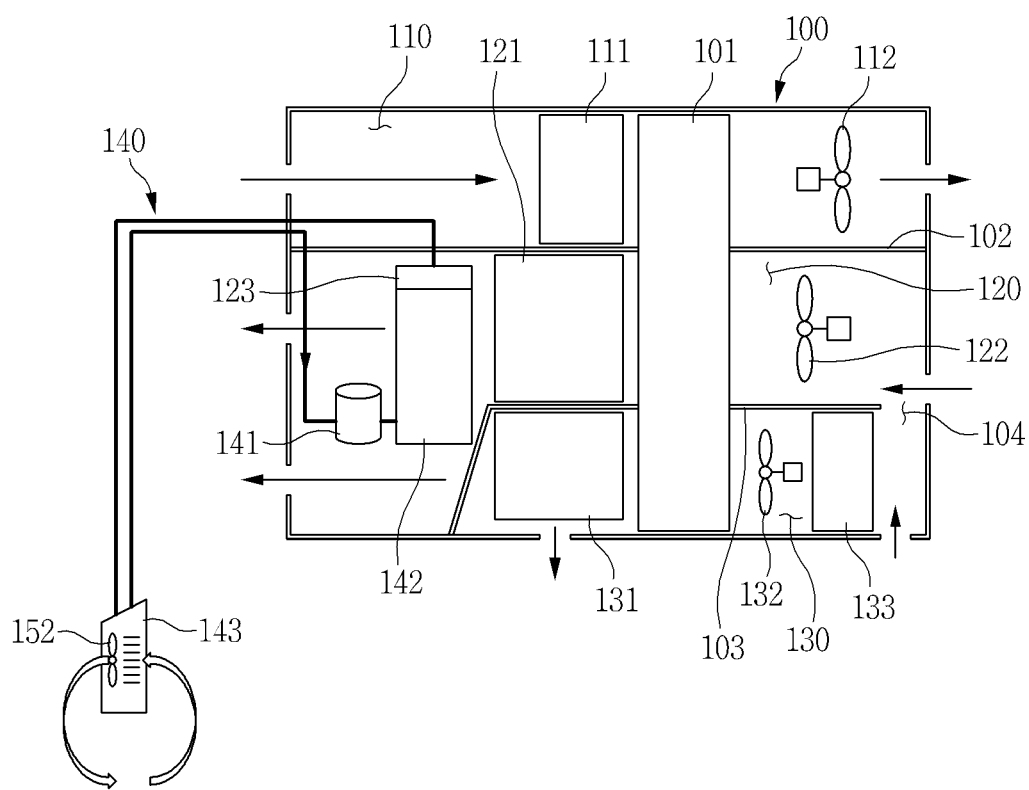
FIG. 4 is a diagram schematically illustrating a dehumidifying and cooling apparatus according to a fourth embodiment of the present invention.
Figure 5:
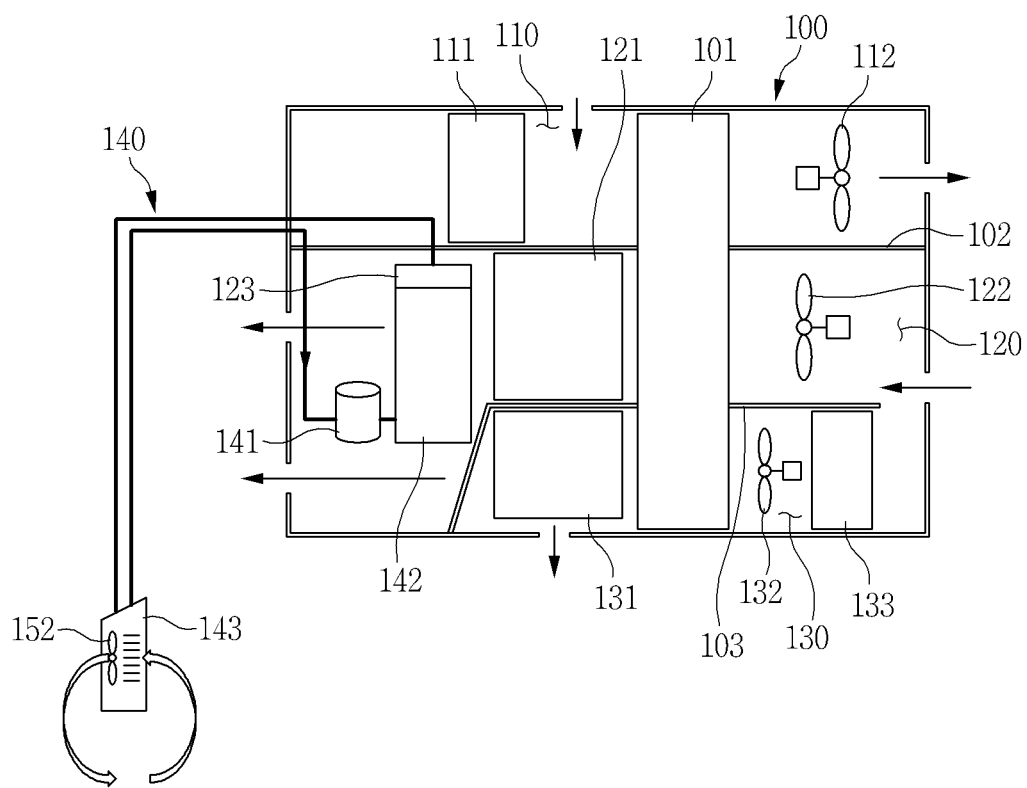
FIG. 5 is a diagram schematically illustrating a dehumidifying and cooling apparatus according to a fifth embodiment of the present invention.

FIG. 1 is a diagram schematically illustrating a dehumidifying and cooling apparatus according to a first embodiment of the present invention. FIG. 2 is a diagram schematically illustrating a dehumidifying and cooling apparatus according to a second embodiment of the present invention. FIG. 3 is a diagram schematically illustrating a dehumidifying and cooling apparatus according to a third embodiment of the present invention. FIG. 4 is a diagram schematically illustrating a dehumidifying and cooling apparatus according to a fourth embodiment of the present invention. FIG. 5 is a diagram schematically illustrating a dehumidifying and cooling apparatus according to a fifth embodiment of the present invention.

As illustrated in FIG. 1, the dehumidifying and cooling apparatus, which is designated by reference numeral 1, according to the first embodiment of the present invention may include a housing 100 which has first and second channels 110 and 120 formed therein, first air passing through the first channel 110, second air passing through the second channel 120, a heating unit 111 which is disposed in the first channel 110 to heat the first air, a desiccant rotor 101 which is rotatably installed in the housing 100 such that the desiccant rotor is dried by the first air heated by the heating unit 111 and absorbs moisture from the second air, a cooling unit 121 disposed in the second channel to cool the second air which has passed through the desiccant rotor 101, and a refrigerant circulation unit 140 having a refrigerant circulation circuit, which includes a compressor 141, a condenser 142, and an evaporator 143.

The housing 100 defines the external appearance of the dehumidifying and cooling apparatus 1 according to the embodiment, and the first and second channels 110 and 120 are formed in the housing 100 in the state in which they are partitioned by a partition wall 102.

The air passing through the first channel 110 may be defined as first air. The first air may be, for instance, air introduced into the first channel 110 from an outdoor space. The first air may be discharged to the outdoor space after passing through the first channel 110.

The heating unit 111 is disposed in the first channel 110. The heating unit 111 is disposed in the flow path of the first air in the first channel 110 such that the first air passes through the heating unit 111. The heating unit 111 may be an apparatus such as a heat coil which provides heat using electric resistance, or an apparatus which provides heat using hot water. Thereby, the first air is heated while passing through the heating unit 111. The first air heated by the heating unit 111 dries the desiccant rotor 101 which will be described in detail later.

As illustrated in the drawing, the desiccant rotor 101 is disposed in the housing 100. The desiccant rotor 101 is disposed over the first and second channels 110 and 120, and is rotatably disposed in the housing 100.

The desiccant rotor 101 has an absorbent, such as silica gel or zeolite, which is formed on the contact surface with air, and may absorb moisture from the air passing therethrough.

Since the desiccant rotor 101 is well known, a detailed description thereof will be omitted. A variety of known desiccant rotors may be used as the desiccant rotor 101.

The air passing through the second channel 120 may be defined as second air. The second air may be, for instance, air introduced from the outdoor space. The desiccant rotor 101 absorbs moisture from the second air while the second air passes through the desiccant rotor 101, with the consequence that the second air is dehumidified.

In order to cool the second air dehumidified through the desiccant rotor 101, the cooling unit 121 is disposed in the second channel 120. The cooling unit 121 may be, for instance, an evaporative cooler which sprays water on second air passing therethrough so as to cool the second air in the process of evaporating the sprayed water.

The dehumidifying and cooling apparatus 1 according to the embodiment includes the refrigerant circulation unit 140 having the refrigerant circulation circuit, which includes the compressor 141, the condenser 142, and the evaporator 143. In this case, the condenser 142 is disposed in the second channel 120. The refrigerant passing through the condenser 142 is condensed by the second air cooled by the cooling unit 121.

The dehumidifying and cooling apparatus 1 according to the embodiment differs from conventional dehumidifying and cooling apparatuses in that the second air cooled by the cooling unit 121 cools the refrigerant circulating in the condenser 142.

The dehumidifying and cooling apparatus 1 according to the embodiment may further include a water supply unit 123 which is disposed in the second channel 120 so as to spray water on the surface of the condenser 142. The operation of the water supply unit 123 may be controlled by a controller.

When water is sprayed on the surface of the condenser 142 by the operation of the water supply unit 123, the second air cooled by the cooling unit 121 exchanges heat with the water sprayed on the surface of the condenser 142 while passing through the condenser 142.

In this process, the heat of the second air is absorbed as the evaporative latent heat of the water sprayed on the surface of the condenser 142 so that the second air is further cooled, and the condensation temperature of the refrigerant circulating in the condenser 142 is further lowered by the further cooled second air. Consequently, the dehumidifying and cooling apparatus 1 according to the embodiment can further reduce the power consumption of the compressor 141.

The dehumidifying and cooling apparatus 1 according to the embodiment realizes interior cooling using the refrigerant cooled by the second air, with the consequence that it is unnecessary to install an air circulation duct in a structure as in conventional dehumidifying and cooling apparatuses.

The refrigerant condensed by the condenser 142 may exchange heat with water or air while passing through the evaporator 143. The water or air, which is cooled by heat exchange, may be utilized for interior cooling.

As a specific utilization example for interior cooling, the evaporator 143 may be first a plate-type heat exchanger. The dehumidifying and cooling apparatus 1 according to the embodiment may further include a cold water circulation pipe 161 which is connected to the plate-type heat exchanger.

The water circulating in the cold water circulation pipe 161 may be cooled while exchanging heat with the refrigerant circulating in the plate-type heat exchanger 143. The water cooled while circulating the cold water circulation pipe 161 may be utilized for interior cooling.

Although not illustrated in the drawing, a portion of the cold water circulation pipe 161 may be, for example, disposed within the interior floor, ceiling, or wall of a structure in which the dehumidifying and cooling apparatus 1 is installed. Accordingly, the inside of the structure may be cooled in a panel cooling manner by disposing the cold water circulation pipe 161 in the interior floor, ceiling, or wall.

Alternatively, a portion of the cold water circulation pipe 161 may be is disposed in a fan coil unit 151, as illustrated in the drawing, and the inside of the structure may also be cooled by operating the fan coil unit 151.

Meanwhile, all of the second air, which is dehumidified and cooled by sequentially passing through the desiccant rotor 101 and the cooling unit 121 in the second channel 120, may be discharged to the outdoor space.

Alternatively, in order to further improve interior cooling efficiency, a portion of the cooled second air may be discharged to the outdoor space while the remainder may be extracted and supplied to an indoor space.

The first air may forcibly pass through the first channel 110 by operating a first blower 112 disposed in the first channel 110. Similarly, the second air may forcibly pass through the second channel 120 by operating a second blower 122 disposed in the second channel 120.

The dehumidifying and cooling apparatus 1 according to the embodiment may further include a controller (not shown) which controls the operation or stop of the first and second blowers 112 and 122. In this case, the controller may control the blowers such that each of the first and second blowers 112 and 122 is selectively operated or stopped.

Hereinafter, the operation of the dehumidifying and cooling apparatus 1 according to the above-mentioned first embodiment will be described in detail.

The first air introduced into the first channel 110 from the outdoor space is heated by the heating unit 111, and then heats the desiccant rotor 101 while passing through the desiccant rotor 101 which is rotating. The first air, which has passed through the desiccant rotor 101, may be discharged to the outdoor space.

The second air introduced into the second channel 120 from the outdoor space is dehumidified while passing through the desiccant rotor 101 which is rotating. In the process in which the desiccant rotor 101 rotates, the desiccant rotor 101, which absorbs moisture from the second air, is dried by the first air, which is heated by passing through the first channel 110, and is regenerated again.

The second air, which is dehumidified by passing through the desiccant rotor 101, is cooled while passing through the cooling unit 121. All of the cooled second air may exchange heat in the condenser 142 with the refrigerant circulating in the condenser 142 disposed in the second channel 120.

Alternatively, a portion of the cooled second air may be heat-exchanged in the condenser 142 while the remainder may be extracted and supplied to the indoor space so as to be used for interior cooling.

In this case, the heat of the second air is absorbed as the evaporative latent heat of the water sprayed on the surface of the condenser 142 by controlling the operation of the water supply unit 123, thereby enabling the condensation temperature of the refrigerant circulating in the condenser 142 to be further lowered.

The refrigerant circulating in the condenser 142 is condensed by heat exchange with the cooled second air, and is then circulated in the evaporator 143. The refrigerant circulating in the evaporator 143 may exchange heat with the water circulating in the cold water circulation pipe 161, as described above. The cold water, which exchanges heat with the refrigerant, may be used to cool the inside in a panel cooling manner, or be used to cool the inside by the fan coil unit 151.

FIG. 2 is a diagram schematically illustrating a dehumidifying and cooling apparatus according to a second embodiment of the present invention.

As illustrated in the drawing, the dehumidifying and cooling apparatus, which is designated by reference numeral 2, according to the second embodiment of the present invention differs from that of the first embodiment in that a third channel 130 is further formed in the housing 100 in addition to the above-mentioned first and second channel 110 and 120.

In this case, a desiccant rotor 101 is disposed over the first to third channels 110 to 130 in the housing 100. Cooling units 121 and 131 are disposed in the second and third channels 120 and 130, respectively.

The air passing through the third channel 130 may be defined as third air. The third air may be air introduced into the third channel 130 from the indoor space. The air introduced into the third channel 130 is dehumidified and cooled while sequentially passing through the desiccant rotor 101 and the cooling unit 131.

The cooled third air may be supplied back to the indoor space, and the indoor space may be cooled and dehumidified by the third air supplied thereto. The third channel 130 may be connected to an interior ventilation duct, which is already formed in a structure, such that air introduced from the indoor space passes through the third channel and is then discharged back to the indoor space.

A third blower 132, which allows the third air to forcibly pass through the third channel 130, may be disposed in the third channel 130. The third blower 132 may be controlled so as to be selectively operated or stopped by the controller, similar to the first and second blowers 112 and 122 which are described in the first embodiment. The controller may control the blowers such that only the first and second blowers 112 and 122 are operated, or may control the blowers such that all of the first to third blowers 112 to 132 are operated as occasion demands in order to further improve interior cooling and dehumidifying efficiency. Alternatively, the controller may control the blowers such that the first and second blowers 112 and 122 are stopped and only the third blower 132 is operated.

The dehumidifying and cooling apparatus 2 according to the embodiment may further include an air filter 133 which is disposed in the third channel 130 so as to remove dust, foreign substances, and the like in the third air passing through the third channel 130.

FIG. 3 is a diagram schematically illustrating a dehumidifying and cooling apparatus according to a third embodiment of the present invention.

As illustrated in the drawing, the dehumidifying and cooling apparatus, which is designated by reference numeral 3, according to the third embodiment of the present invention differs from those of the first and second embodiments in that it cools the inside using refrigerant condensed by the condenser 142.

The evaporator 143 of the dehumidifying and cooling apparatus 3 according to the embodiment may be an evaporator constituting an air conditioner. The dehumidifying and cooling apparatus 3 according to the embodiment may further include a blower fan 152 which is disposed adjacent to the evaporator 143.

Indoor air is supplied back to the indoor space via the evaporator 143 by the operation of the blower fan 152. The indoor air is cooled while exchanging heat with the refrigerant circulating in the evaporator 143 in the process of passing through the evaporator 143. The indoor space may be cooled by the cooled air. The dehumidifying and cooling apparatus 3 according to the embodiment can use an air conditioner which is usually installed in the indoor space.

FIG. 4 is a diagram schematically illustrating a dehumidifying and cooling apparatus according to a fourth embodiment of the present invention.

As illustrated in the drawing, the dehumidifying and cooling apparatus, which is designated by reference numeral 4, according to the fourth embodiment of the present invention differs from that of the second embodiment in that the second air introduced into the second channel 120 and the third air introduced into the third channel 130 are a mixture (mixed air) of air introduced from the outdoor space and air introduced from the indoor space.

The housing 100 may have a mixing space 104 which is provided over the inlets of the second and third channels 120 and 130 in order to mix the air introduced from the outdoor space with the air introduced from the indoor space.

A portion of the mixed air introduced into the mixing space 104 by the operation of the second and third blowers 122 and 132 may be introduced into and pass through the second channel 120 while the remainder may be introduced into and pass through the third channel 130.

The dehumidifying and cooling apparatus 4 according to the embodiment can perform interior ventilation in addition to interior cooling and dehumidification, by introducing a mixture (mixed air) of indoor air and outdoor air into the third channel 130 and supplying the mixed air, which has passed through the third channel 130, back to the indoor space.

FIG. 5 is a diagram schematically illustrating a dehumidifying and cooling apparatus according to a fifth embodiment of the present invention.

As illustrated in the drawing, the dehumidifying and cooling apparatus, which is designated by reference numeral 5, according to the fifth embodiment of the present invention differs from that of the fourth embodiment in that indoor air, instead of outdoor air, is introduced into the first channel 110.

That is, the first air introduced into the first channel 110 may be air introduced from the indoor space. The introduced first air may be heated through the heating unit 111 and then pass through the desiccant rotor 101, or may be introduced into the space between the heating unit and the desiccant rotor 101 and then pass through the desiccant rotor 101 without passing through the heating unit 111. The first air, which has passed through the first channel 110, is discharged to the outdoor space.

The dehumidifying and cooling apparatus 5 according to the fifth embodiment differs from that of the fourth embodiment in that the third air passing through the third channel 130 is air introduced from the outdoor space, rather than a mixture (mixed air) of indoor air and outdoor air.

The air introduced from the outdoor space may pass through the second and third channels 120 and 130.

However, the controller may control the blowers such that the second blower 122 is stopped and the first and third blowers 112 and 132 are operated.

In this case, indoor air is discharged to the outdoor space through the first channel 110, and outdoor air is supplied back to the indoor space after passing through the third channel 130 in order to ventilate the indoor space.

In such ventilation operation, both of the desiccant rotor 101 and the cooling unit 131 are operated during the summer season such that the outdoor air passing through the third channel 130 is dehumidified and cooled, and is then supplied to the indoor space, with the consequence that it is possible to achieve interior dehumidification and cooling.

The operation of the cooling unit 131 is stopped and only the desiccant rotor 101 is operated during the winter season, such that the indoor air passing through the first channel 110 transfers heat to the desiccant rotor 101 while passing through the desiccant rotor 101, and is then discharged to the outdoor space, and the outdoor air passing through the third channel 130 recovers heat energy from the desiccant rotor 101 while passing through the desiccant rotor 101, and is then supplied to the indoor space.

The introduction of the indoor air into the first channel 110 and the supply of the third air to the indoor space from the third channel 130 may be performed using an interior ventilation duct formed in a structure.

The dehumidifying and cooling apparatus 5 according to the embodiment having the above-mentioned structure can achieve a ventilation effect of recovering high-efficient energy when only ventilation is required without the need of interior cooling.

Although the present invention has been described with respect to the illustrative embodiments, it should be understood that numerous other modifications and applications may be devised by those skilled in the art that will fall within the intrinsic aspects of the embodiments. More particularly, various variations and modifications are possible in concrete constituent elements of the embodiments.

In addition, it is to be understood that differences relevant to the variations and modifications fall within the spirit and scope of the present disclosure defined in the appended claims.

[Description of Reference Numerals]

| | |
|---|---|
| 1, 2, 3, 4, 5: dehumidifying and cooling apparatus | |
| 100: housing | |
| 101: desiccant rotor | 102, 103: partition wall |
| 104: mixing space | 110: first channel |
| 111: heating unit | 112: first blower |
| 120: second channel | 121: cooling unit |
| 122: second blower | 123: water supply unit |
| 130: third channel | 131: cooling unit |
| 132: third blower | 133: air filter |
| 140: refrigerant circulation unit | 141: compressor |
| 142: condenser | 143: evaporator |
| 151: fan coil unit | 152: blower fan |
| 161: cold water circulation pipe | |

The invention claimed is:

1. A dehumidifying and cooling apparatus comprising:
a housing having first and second channels formed therein, first air passing through the first channel, second air passing through the second channel;
a heater disposed in the first channel to heat the first air;
a desiccant rotor rotatably installed in the housing such that the desiccant rotor is dried by the first air heated by the heater and absorbs moisture from the second air;
a cooler disposed in the second channel to cool the second air having passed through the desiccant rotor; and a refrigerant circulation circuit including a compressor and a condenser, wherein the condenser is disposed in the second channel so that a refrigerant circulating in the condenser is condensed by heat exchange with the second air cooled by the cooler, wherein a portion of the second air cooled by the cooler is discharged to an outdoor space after heat exchange in the condenser, while a remainder of the second air cooled by the cooler is supplied to an indoor space.

2. The dehumidifying and cooling apparatus of claim 1, wherein the first air is air introduced into the first channel from the outdoor space, and the first air passing through the first channel is discharged to the outdoor space.

3. The dehumidifying and cooling apparatus of claim 1, wherein:
the second air is air introduced into the second channel from the outdoor space.

4. The dehumidifying and cooling apparatus of claim 1, further comprising:
a first blower disposed in the first channel such that the first air forcibly passes through the first channel; and
a second blower disposed in the second channel such that the second air forcibly passes through the second channel.

5. The dehumidifying and cooling apparatus of claim 4, wherein each of the first and second blowers is selectively operated or stopped by a controller.

6. The dehumidifying and cooling apparatus of claim 1, wherein:
the refrigerant circulation circuit further comprises an evaporator; and
the dehumidifying and cooling apparatus further comprises a cold water circulation pipe connected to the evaporator such that water circulating in the cold water circulation pipe exchanges heat with the refrigerant circulating in the evaporator.

7. The dehumidifying and cooling apparatus of claim 6, wherein at least a portion of the cold water circulation pipe is disposed within at least one of an interior floor, an interior ceiling, and an interior wall, or is disposed in a fan coil assembly.

8. The dehumidifying and cooling apparatus of claim 1, wherein:
the refrigerant circulation circuit further comprises an evaporator; and
the dehumidifying and cooling apparatus further comprises a blower fan for forcibly blowing indoor air, such that the indoor air exchanges heat with the refrigerant circulating in the evaporator and is then supplied back to the indoor space.

9. The dehumidifying and cooling apparatus of claim 1, further comprising a water supply assembly disposed in the second channel so as to spray water on a surface of the condenser.

10. A dehumidifying and cooling apparatus comprising:
a housing having first, second, and third channels formed therein, first air passing through the first channel, second air passing through the second channel, third air passing through the third channel;
a heater disposed in the first channel to heat the first air;
a desiccant rotor rotatably installed in the housing such that the desiccant rotor is dried by the first air heated by the heater and absorbs moisture from the second air and the third air;
first and second coolers disposed in the respective second and third channels so as to respectively cool the second air and the third air having passed through the desiccant rotor; and
a refrigerant circulation circuit comprising a compressor and a condenser, wherein:
the condenser is disposed in the second channel so that a refrigerant circulating in the condenser is condensed by heat exchange with the second air cooled by the first cooler; and
the third air is one of air introduced from an indoor space, a mixture of air introduced from the indoor space and air introduced from an outdoor space, and air introduced from the outdoor space, and the third air is cooled by the second cooler and is then discharged to the indoor space,
wherein a portion of the second air cooled by the cooler is discharged to an outdoor space after heat exchange in the condenser, while a remainder of the second air cooled by the cooler is supplied to an indoor space.

11. The dehumidifying and cooling apparatus of claim 10, wherein the first air is air introduced from the outdoor space or air introduced from the indoor space, and the first air is discharged to the outdoor space after passing through the desiccant rotor.

12. The dehumidifying and cooling apparatus of claim 10, wherein:
the second air is air introduced from the outdoor space or a mixture of air introduced from the indoor space and air introduced from the outdoor space.

13. The dehumidifying and cooling apparatus of claim 10, further comprising:
a first blower disposed in the first channel such that the first air forcibly passes through the first channel;
a second blower disposed in the second channel such that the second air forcibly passes through the second channel; and
a third blower disposed in the third channel such that the third air forcibly passes through the third channel.

14. The dehumidifying and cooling apparatus of claim 13, wherein each of the first, second, and third blowers is selectively operated or stopped by a controller.

15. The dehumidifying and cooling apparatus of claim 10, further comprising an air filter disposed in the third channel.

16. The dehumidifying and cooling apparatus of claim 10, wherein:
the refrigerant circulation circuit further comprises an evaporator; and
the dehumidifying and cooling apparatus further comprises a cold water circulation pipe connected to the evaporator such that water circulating in the cold water circulation pipe exchanges heat with the refrigerant circulating in the evaporator.

17. The dehumidifying and cooling apparatus of claim 16, wherein a portion of the cold water circulation pipe is disposed within at least one of an interior floor, an interior ceiling, and an interior wall, or is disposed in a fan coil assembly.

18. The dehumidifying and cooling apparatus of claim 10, wherein:
the refrigerant circulation circuit further comprises an evaporator; and
the dehumidifying and cooling apparatus further comprises a blower fan for forcibly blowing indoor air, such that the indoor air exchanges heat with the refrigerant circulating in the evaporator and is then supplied back to the indoor space.

19. The dehumidifying and cooling apparatus of claim 10, further comprising a water supply assembly disposed in the second channel so as to spray water on a surface of the condenser.

* * * * *